Nov. 18, 1930.   R. F. KOHR   1,781,691
BRAKE
Filed Jan. 16, 1928   2 Sheets-Sheet 1

INVENTOR.
Robert F Kohr
BY
ATTORNEY

Patented Nov. 18, 1930

1,781,691

UNITED STATES PATENT OFFICE

ROBERT F. KOHR, OF SOUTH BEND, INDIANA, ASSIGNOR TO THE STUDEBAKER CORPORATION, OF SOUTH BEND, INDIANA, A CORPORATION OF NEW JERSEY

BRAKE

Application filed January 16, 1928. Serial No. 247,225.

This invention relates to brake shoes and particularly to shoes for brakes of the internal-expanding type, the principal object being to provide a brake shoe comprising two pressed metal angle members positioned back to back to provide a rigid construction which is light in weight and economical to manufacture.

Another object is to provide a brake shoe with two angular sections secured back to back, the reinforcing flange of one section being offset and extending beyond the reinforcing flange of the other section.

Another object is to provide a brake shoe with two angular sections secured back to back, the reinforcing flange of one section being offset to provide an abutment for the marginal edge of the other section and being extended beyond the same to effect a continuation thereof.

A further object is to provide a brake shoe with two arcuate lining attaching portions having radial flanges abutting against and secured to each other to provide a double thickness reinforcing web, one of the radial flanges being offset from the other to provide a seat for the marginal edge thereof and being extended beyond the same to provide a single thickness reinforcing web.

These being among the objects of the present invention, the same consists of certain features of construction and combinations of parts to be hereinafter described with reference to the accompanying drawings, and then claimed, having the above and other objects in view.

In the accompanying drawings which illustrate a suitable embodiment of the present invention:

Figure 5:
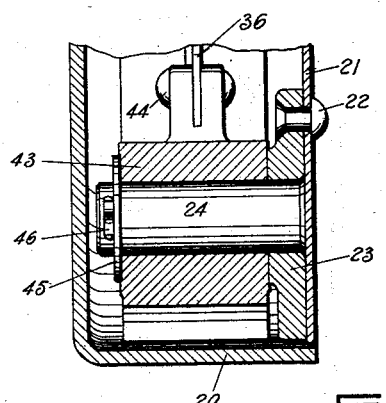
Figure 5 is an enlarged section taken on the line 5—5 of Figure 1 showing the method of anchoring the end of the brake shoe.

Referring to the accompanying drawings in which like numerals refer to like parts throughout the several views, the brake chosen for illustration comprises a brake drum 20 mounted upon a vehicle wheel or on a vehicle transmission shaft. Adjacent to and closing in the open end of the drum 20, is a dust cover or backing plate 21 which is securely mounted on some stationary part, such as the steering knuckle of the wheel (not shown). Secured by rivets 22 to the inner surface of the backing plate 21, as shown in Figure 5, is an anchor bracket 23 which carries two parallel spaced anchor pins 24. These anchor pins 24 are preferably held in the supporting bracket 23 by a force fit. The openings in the bracket 23 are made slightly smaller than the anchor pins 24 and before the pins 24 are inserted, the bracket 23 is heated to expand the openings an amount sufficient to allow the pins 24 to be inserted. When the metal surrounding the openings cools, the openings tend to contract and thereby clamp the pins 24 in place. The brake shoes, which will be described in detail later in the specification, are pivotally arranged within the drum 20 on the anchor pins 24 and are adapted to be moved outwardly into contact with the brake drum 20. The free ends of the brake shoes contact against opposite sides of a rotatable operating cam 25 which is secured by a washer 26 and screw 27 to one end of an operating shaft 28. The shaft 28 is journaled in a supporting bracket 29 secured by bolts 30 to the backing plate 21. One end of the shaft 28 projects through the bracket 29 and is provided with an arm 31 which is connected with a source of braking pressure such as a brake foot pedal or hand lever (not shown).

The brake shoes are preferably built entirely of pressed metal stampings assembled together to provide a construction which is light in weight, economical to manufacture, and which is very rigidly reinforced. Each shoe comprises two pressed metal angle members, one of which has an axial supporting flange 32 and an integral reinforcing web 33 at one side thereof. The other angle member also comprises an axial supporting flange 34 and an integral radial reinforcing web 35 at one side thereof which is offset at 37 to form a web 36. The two angle members are assembled together back to back with the webs 33 and 35 abutting against and secured together by rivets, bolts, welding or other suitable means. The offset portion 37 of the web 35 forms a seat against which the marginal edge of the web 33 abuts, and the offset web 36 forms, in effect, a continuation of the web 33. This provides the brake shoe with a reinforcing web of double thickness of metal adjacent to the axial flanges 32 and 34 where maximum rigidity is required, and a reinforcing web of single thickness of metal adjacent to and integral with the web 35, thus eliminating the use of double thickness of metal at the inner edge of the reinforcing web to thus reduce the weight of the brake shoe. The seat 37, against which the marginal edge of the web 33 abuts, also prevents excessive strain from being exerted on the welds or other securing means which secure the webs 33 and 35 together. The axial flanges 32 and 34 lie in the same plane and form a substantially continuous surface to which an arcuate reinforcing band 50 may be secured by welding or other desirable means to give added strength and rigidity to the brake shoe. The brake friction facing 51 is secured by rivets 52 or other suitable means to the band 50 and flanges 32 and 34, but it is to be understood, that the friction facing 51 may be secured directly to the axial flanges 32 and 34 without the use of the reinforcing band 50.

Figure 3:
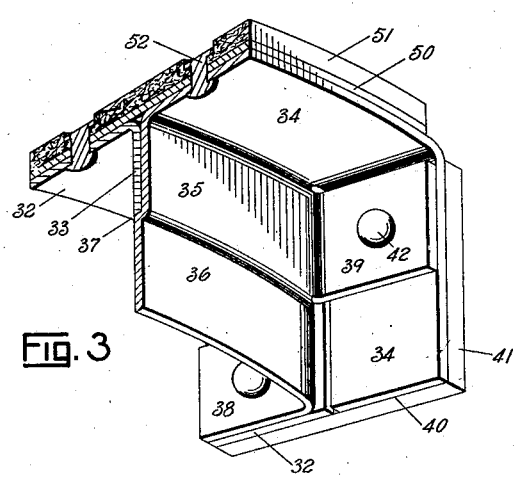
Figure 3 is an enlarged fragmentary perspective view taken approximately on the line 3—3 of Figure 1 showing the cam contact end of the brake shoe.

The cam contact end of the shoe is formed in a novel manner as seen in Figure 3. At one end of the shoe the integral connection between the offset portion 36 and radial web 35 is slotted to provide the web 36 with a tongue 38. The tongue 38 is then bent at substantially right angles to the offset web 36. The bend in the integral connection between the web 35 and the lining-attaching portion 34 is also slotted to provide the web 35 with a projecting tongue 39 which is also bent at substantially right angles to the web 35, but in the opposite direction to the tongue 38. The oppositely extending tongues 38 and 39 form coplanar abutment faces for the ends of the axial flanges 32 and 34 which are bent substantially radially perpendicular thereto, the flange 32 being welded or otherwise secured to the tongue 38 and the flange 34 being welded or otherwise secured to the tongue 39. The radially bent ends of these two surfaces 32 and 34 provide a radial transverse supporting surface 40 for the cam bearing plate 41 which is secured thereto by rivets 42, or other suitable means.

Figure 1:
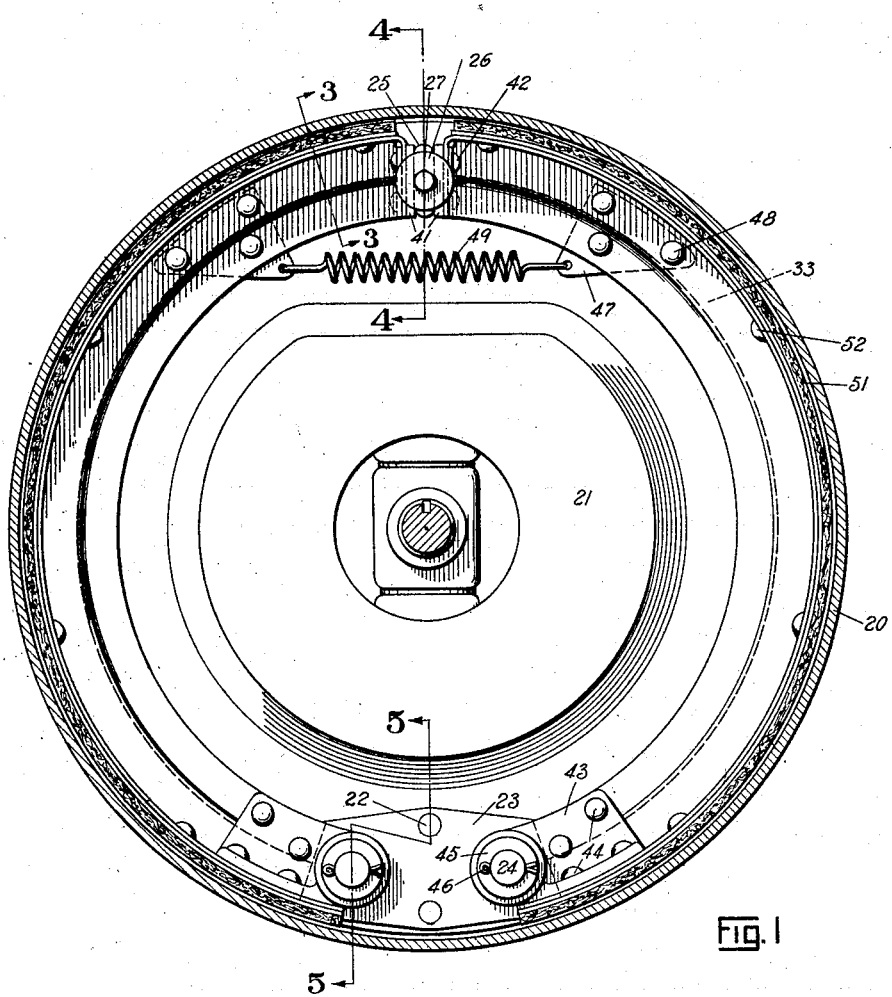
Figure 1 is a section of a vehicle brake taken just inside the closed end of the brake drum to show the brake shoes in elevation.
Figure 2:
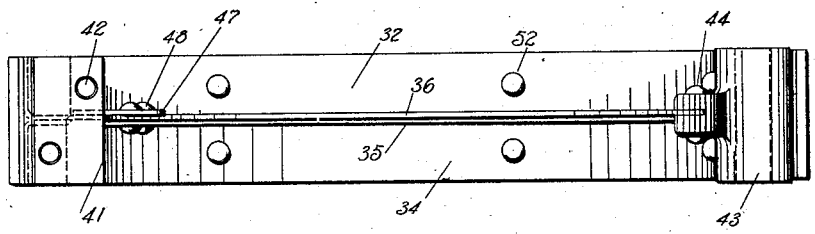
Figure 2 is a plan view of one of the brake shoes looking toward the concave surface thereof.
Figure 4:
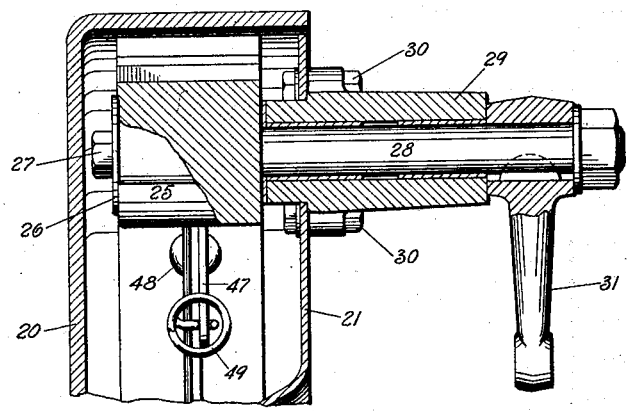
Figure 4 is an enlarged section taken on the line 4—4 of Figure 1 showing the brake operating cam.

An anchor bracket 43 is secured to the radial webs and axial flanges at the other end of each brake shoe by rivets 44, or other suitable means as shown in Figures 1 and 5. This bracket 43 is pivotally received on the pin 24 and the shoe is held against longitudinal movement thereof by a washer 45 and a cotter pin 46. Each shoe is provided with a flat plate 47 secured to the coplanar surfaces of the web 33 and offset rib 36 of the web 35 by suitable means such as rivets 48. A coil spring 49 having its ends hooked through the plates 47 normally draws the free ends of the brake shoes out of contact with the brake drum 20 and against the operating cam 25 so that the cam bearing plates 41 contact therewith.

Figure 6:
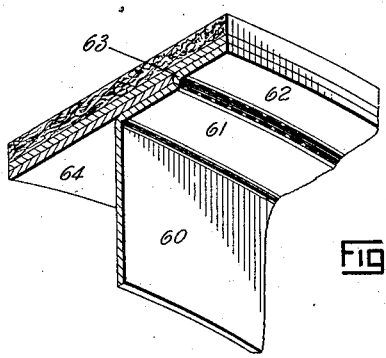
Figure 6 is a fragmentary perspective view of a modified form of brake shoe.

A modified form of brake shoe is shown in section of Figure 6 which comprises an angle shaped member having a radial reinforcing web 60 and an axial supporting flange 61, the flange 61 being provided with offset portion 62. The offset portion 62 forms a seat 63 for the marginal edge of an arcuate band 64 which is secured by any suitable means to the flange 61. The outer surfaces of the band 64 and offset portion 62 provides the brake shoe with a suitable brake lining attaching surface as previously described in connection with the construction shown in the other figures.

Formal changes may be made in the specific embodiment of the invention described without departing from the spirit and substance of the broad invention, the scope of which is commensurate with the appended claims.

What I claim is:

1. A brake shoe comprising two angular sections secured back to back, the reinforcing web of one section having an offset therein and having the inner edge thereof extending beyond the reinforcing web of the other of said sections.

2. A brake shoe comprising two angular sections secured back to back, the reinforcing web of one of said sections having an offset portion to provide an abutment for the reinforcing web of the other of said sections, and having its inner portion extending beyond the offset in substantially the same plane as said other web.

3. A brake shoe comprising two angular sections secured back to back, the reinforcing web of one of said sections having an offset portion extending inwardly beyond and in substantially the same plane with the reinforcing web of the other of said sections.

4. A brake shoe comprising two angular sections secured back to back, the reinforcing web of one of said sections being offset to provide an abutment for the marginal edge of the other of said sections and having its inner edge extended beyond said other section to effect a continuation thereof.

5. A brake shoe comprising two independent angular sections secured back to back, the reinforcing web of one of said sections being offset to provide a surface flush with the other of said sections and being extended beyond the same in substantially the same plane therewith to effect a continuation thereof.

6. A brake shoe comprising two arcuate lining-attaching portions having radial webs secured to each other to provide a reinforcing web of double thickness of metal, one of said webs being offset to provide a reinforcing web of single thickness of metal extending radially inwardly from said other web.

7. A brake shoe comprising two arcuate lining-attaching portions having radial webs abutting against and secured to each other to provide a double thickness reinforcing web, one of said webs being offset to provide a seat for the marginal edge of said other web and extended beyond the same in substantially the same plane therewith to provide a single thickness reinforcing web.

8. A brake shoe comprising two angular sections secured back to back having the reinforcing web of one section provided with an offset therein with its inner portion extending beyond the other of said sections, and a strengthening plate secured to the free faces of said sections.

9. A brake shoe comprising two arcuate members of L-shaped section secured back to back, having the reinforcing web of one section provided with an offset therein with its inner portion extending beyond the reinforcing web of the other of said sections, a reinforcing strip conforming with and secured to the free faces of said arcuate members, and brake friction lining secured to said reinforcing strip.

10. A brake shoe comprising two independent angular L-shaped sections arranged back to back, having one back portion offset intermediate its edges to provide an abutment for the marginal edge of the other back portion and having its inner portion extending beyond the other back portion to provide a reinforcing web, and a reinforcing lining-attaching band extending across the outer faces of said angular sections.

11. A brake shoe comprising two independent stamped metal parts of L-shaped section arranged back to back, having one back portion offset intermediate its edges and extending beyond the other back portion to provide a seat for the marginal edge thereof.

12. A brake shoe comprising two independent angle-shaped pressed-metal members secured back to back providing arcuate lining-attaching parts and radial webs, one of said webs being offset and extending beyond the other of said webs, and a radial cam-bearing plate secured across one end thereof.

Signed by me at South Bend, Indiana this 11th day of January, 1928.

ROBERT F. KOHR.